US006633855B1

(12) United States Patent
Auvenshine

(10) Patent No.: US 6,633,855 B1
(45) Date of Patent: Oct. 14, 2003

(54) METHOD, SYSTEM, AND PROGRAM FOR FILTERING CONTENT USING NEURAL NETWORKS

(75) Inventor: John Jason Auvenshine, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,925

(22) Filed: Jan. 6, 2000

(51) Int. Cl.[7] .............................. G06E 1/00; G06E 3/00; G06F 15/18; G06G 7/00
(52) U.S. Cl. .............................. 706/15; 706/25; 706/16
(58) Field of Search ................................ 706/15, 25, 16

(56) References Cited

U.S. PATENT DOCUMENTS

| | | | |
|---|---|---|---|
| 5,706,507 A | 1/1998 | Schloss | 707/104.1 |
| 5,727,129 A | 3/1998 | Barrett et al. | 706/10 |
| 5,765,028 A | 6/1998 | Gladden | 706/25 |
| 5,845,271 A | 12/1998 | Thaler | 706/16 |
| 5,852,816 A | 12/1998 | Thaler | 706/20 |
| 5,855,015 A | 12/1998 | Shoham | 707/5 |
| 5,867,799 A | 2/1999 | Lang et al. | 707/1 |
| 5,918,014 A | 6/1999 | Robinson | 709/219 |
| 5,996,011 A | 11/1999 | Humes | 709/225 |

OTHER PUBLICATIONS

Harris Drucker et al; Support Vector Machines for Spam Categorization; Sep. 1999; IEEE; S 1045–9227/99; 1048–1054.*

K. Kukich, "Techniques for Automatically Correcting Words in Text", Dec. 1992, ACM Computing Surveys, vol. 24, No. 4, pp. 378–439.

IBM User Guide, "Net Nanny", 1994, pp. 1–61.

D. Sarkar, "Methods to Speed Up Error Back–Propagation Learning Algorithm", Dec. 1995, ACM Computing Surveys, vol. 27, No. 4, pp. 520–542.

"5.0 Network Selection", Artificial Neural Networks Technology,[retrieved Dec. 3, 1999], retrieved from Internet: <URL http://www.dacs.dtic.mil/techs/neural/neural6.html.

G.B. Search Report for Application No. GB 0031443.5, dated Nov. 22, 2001.

"The Patented IEI Semantic Parser",[retrieved Nov. 15, 2001], retrieved from Internet: <URL http://www.imagination-engines.com/text/semdemo.htm.

* cited by examiner

Primary Examiner—Ramesh Patel
Assistant Examiner—Joseph P. Hirl
(74) Attorney, Agent, or Firm—David W. Victor; Konrad Raynes Victor & Mannu

(57) ABSTRACT

Disclosed is a method, system, and program for filtering a data object for content deemed unacceptable by a user. A data object requested by a viewer program is received. The data object is processed to determine predefined language statements. Information on the determined language statements is inputted into a neural network to produce an output value. A determination is then made as to whether the output value indicates that the data object is unacceptable. Viewer program access to the data object is inhibited upon determining that the data object is unacceptable.

42 Claims, 4 Drawing Sheets

METHOD, SYSTEM, AND PROGRAM FOR FILTERING CONTENT USING NEURAL NETWORKS

BACKGROUND OF THE INVENTION

1. Field of the Invention

The present invention relates to a system, method, and program for filtering content from an incoming data stream being accessed by a viewer program using a neural network to inhibit access to material deemed unacceptable.

2. Description of the Related Art

Although the Internet is heralded as a revolutionary technology capable of empowering people by providing relatively easy access to a tremendous store house of information, it is also derided for allowing unrestricted access to material considered highly inappropriate for children, such as pornography, hate literature, and violence. Many lawmakers and various interest groups have called for government censorship of the Internet because of the availability of such controversial material. One other concern with the Internet has been the ability of children to engage in inappropriate communications with adults on IRC chat lines that not only exposes children to inappropriate material, but also facilitate inappropriate encounters between children and adults. Businesses that network their employee computers to the Internet are also concerned that employees spend time on non-business related Internet activity. Thus, businesses are also interested in controlling which Internet sites their employees may visit to prevent unproductive employee Internet access.

The response of the computer industry to these concerns has been the development of filtering software, such as Net Nanny by Net Nanny LTD., which is described in the "Net Nanny User Guide" (Copyright Net Nanny LTD., 1997). Such prior art filtering software is capable of monitoring Internet software, such as browsers, e-mail and IRC chat room applications and also other application programs, such as word processing and image viewing applications, e.g., Adobe Photoshop, Corel Photo-Paint, and Microsoft Paint. Current filtering software operates by providing a list of Internet sites and words that could be deemed inappropriate to children. To monitor Internet sites, the filtering software developer provides user lists of inappropriate web sites and other Internet sites, such as newsgroups and IRC chat lines, that its in-house researchers have located and deemed inappropriate for a particular age group of children. The purchaser of the filter program, which may be a parent, library, school, etc, may then set the filter software to deny access to all the Internet sites on the provided list.

The current techniques for identifying undesirable web sites rely on the filter developer to provide thorough research on web sites and timely updates. However, there are an immeasurable number of Internet web sites, many of which cannot be located through traditional search engines. Thus, researchers may miss numerous Web sites containing inappropriate material that are not accessible through traditional search techniques. Further, web sites are being added and removed all the time. Thus, a child would have access to inappropriate sites that are added to the Internet between updates of the list.

The prior art method for filtering documents is to scan the document for words on a "hit list" of unacceptable words, and deny access to those documents containing a word on the hit list. This prior art technique for identifying inappropriate documents may screen or deny access to numerous acceptable documents. For instance, if the word "breast" is on the list, then the filtering software would deny access to documents describing cooking recipes for chicken breast or for medical documents on such important issues as breast cancer. In fact, many have criticized the use of word based lists as a filtering tool because it often screens out much useful educational information. For instance, if a list included common hate terms or a discussion of hate groups by a civil rights or anti-hate group, then such filtering software could conceivably deny access to deemed appropriate anti-hate literature.

Businesses are often interested in limiting not only what employees cannot access, like the child filtering product, but also limiting what they can access. For this reason, businesses may use firewall software that would prevent their employees from accessing any Internet sites except those specifically sanctioned or on an approved list. However, such techniques may be problematic because the employee could be barred from readily accessing a work-related site that is not on the approved list, such as a site linked to or mentioned from a site on the approved list.

Thus, there is a need in the art for an improved technique for filtering Internet and computer readable material for inappropriate content, while at the same time providing flexibility to allow access to educational material that may otherwise include words or phrases that are often associated with inappropriate material.

SUMMARY OF THE PREFERRED EMBODIMENTS

To overcome the limitations in the prior art described above, preferred embodiments disclose a method, system, and program for filtering a data object for content deemed unacceptable by a user. A data object requested by a viewer program is received. The data object is processed to determine predefined language statements. Information on the determined language statements is inputted into a neural network to produce an output value. A determination is then made as to whether the output value indicates that the data object is,unacceptable. Viewer program access to the data object is inhibited upon determining that the data object is unacceptable.

In further embodiments, a determination is made as to whether the output value indicates that the data object requires further consideration. If so, information on the data object is logged. User input on a rating indicating the acceptability of the data object is received and the neural network is trained to process the logged data object as input to produce the received rating as output.

The data object may comprise any incoming data stream, such as data from a document or one of multiple packets that form a document requested by the viewer.

In yet further embodiments, inhibiting the viewer program access to the data object upon determining that the data object is unacceptable comprises blocking access to the entire data object. Alternatively, a determination may be made of language statements in the data object that are unacceptable. In such case, inhibiting the viewer program access to the data object upon determining that the data object is unacceptable comprises blocking access to the unacceptable language statements and allowing access to language statements not determined to be unacceptable.

The preferred embodiments provide a filter program that is capable of considering more factors of a document than current filter software that would block access based on the presence of a single unacceptable word. The preferred filter program is capable of considering all unacceptable words as well as acceptable content words. The preferred embodiment filter program utilizes neural networks to train the filter to recognize when a document includes a level of inappropriate language that exceeds an acceptability threshold. Using neural networks allows the filter to consider documents that are not identical to the ones used to train the network; yet what was learned during training is applied to determine whether to inhibit access to a different document. The preferred filter program is an improvement over current art because it is less likely to deny access to acceptable documents that may otherwise include unacceptable words, whereas current filtering programs would reject a document upon the occurrence of a single specified unacceptable word.

Preferred embodiments that filter packets of data, typically transmitted over the Internet, are an improvement over current filter art utilizing lists of unacceptable Internet web sites because the preferred filter program will inhibit access to unacceptable Internet web sites that were not located by searchers creating the list of prohibited web sites or added to the Internet between updates of the list. The preferred filter program also reduces the cost of producing the filter software because the developer does not have to maintain a full-time staff of employees searching for inappropriate web sites to add to the lists of prohibited sites.

Further, in certain embodiments, only the inappropriate statements may be blocked without affecting other statements in the document or incoming data streams if inappropriate material is posted. For instance, if a child is at an acceptable children oriented IRC chat room and someone starts posting obscene or other inappropriate material, only those incoming data streams that contain offensive material would be blocked, without affecting the ability to receive appropriate incoming data stream content from the site. With such embodiments, only access to the unacceptable content is blocked and incoming data streams with acceptable content are allowed through.

Moreover, preferred embodiments allow for continual consideration of Internet sites and documents that are not clearly acceptable or unacceptable by allowing the administrator, such as the parent or employer, to retrain the neural network filter program to provide a specific accept or deny outcome for such documents that do not fall within the unacceptable and acceptable ranges. This allows the administrator to tailor the neural network and provides even greater likelihood that access will not be inhibited to acceptable material including some inappropriate language.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
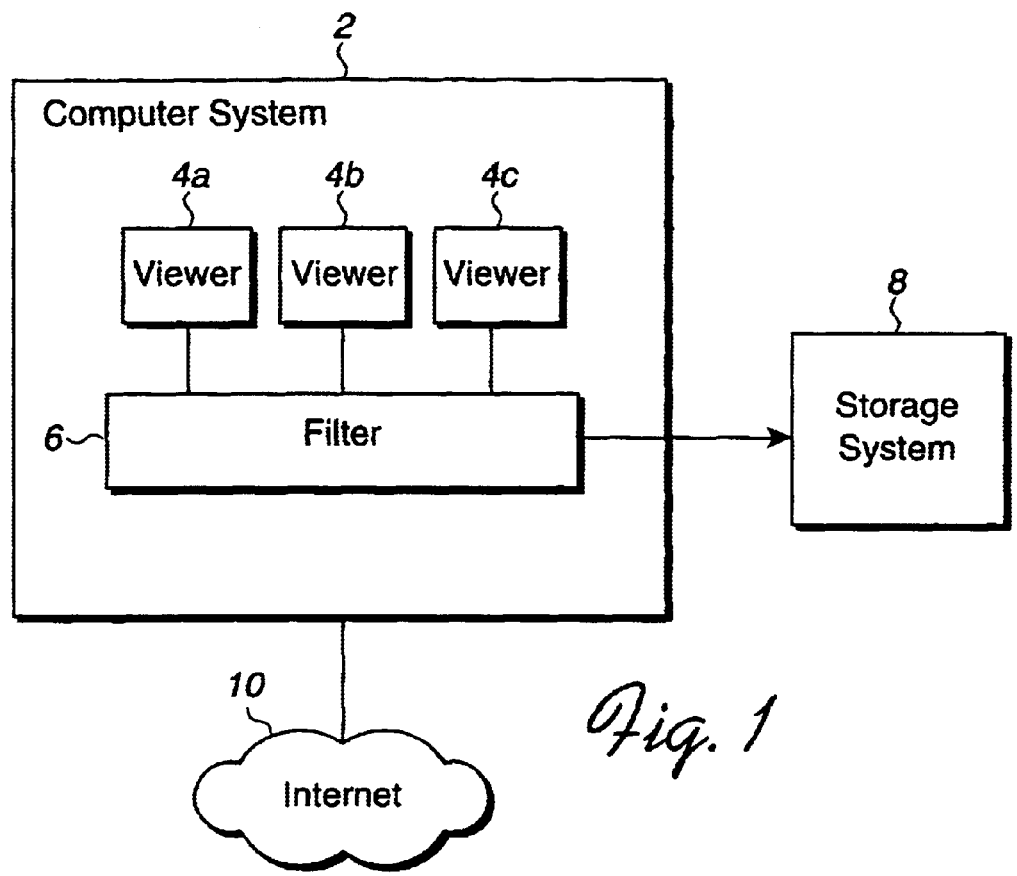
FIG. 1 is a block diagram illustrating a computing environment in which preferred embodiments are implemented.

FIG. 1 illustrates a computing environment in which preferred embodiments are implemented. A computer system 2 includes a plurality of viewer programs 4a, b, c and a filter program 6. The computer system 2 may comprise any computing device known in the art, such as a personal computer, mainframe, workstation, server, hand-held computing device, etc. The viewer programs 4a, b, c may comprise application programs that enable users to view and/or transmit content, such as an HTML Web browser, newsgroup readers, word processing programs, image viewers (e.g., Adobe Acrobat), etc., and communication software that allows person-to-person communication over the Internet (e.g., chat room software, AOL Messenger, ICQ, etc.), The filter program 6 is capable of filtering content requested by the viewers 4a, b, c in order to inhibit access to material deemed undesirable.

The viewers 4a, b, c are capable of accessing data from the Internet and/or a storage system 8, which may comprise one or more hard disk drives, tape storage, CD-ROM, diskette, electronic memory, or any other storage or memory medium known in the art. The term Internet 10 as used herein refers to the World Wide Web as well as any other network or Intranet to which the computer 2 has access. In preferred embodiments, the Internet 10 uses a communication protocol, such as TCP/IP, that transmits data in packets.

In alternative network embodiments, the filter program 6 may be included within a gateway computer or proxy server through which multiple computers in the same Local Area Network (LAN) or wide area network (WAN) access the Internet. In such case, the filter program 6 would filter content for all networked computers accessing the Internet through the gateway computer on which the filter program is installed. In this way, the users at the client computers cannot disable or affect the operations of the filter program 6 on the proxy server or gateway computer.

Figure 2:
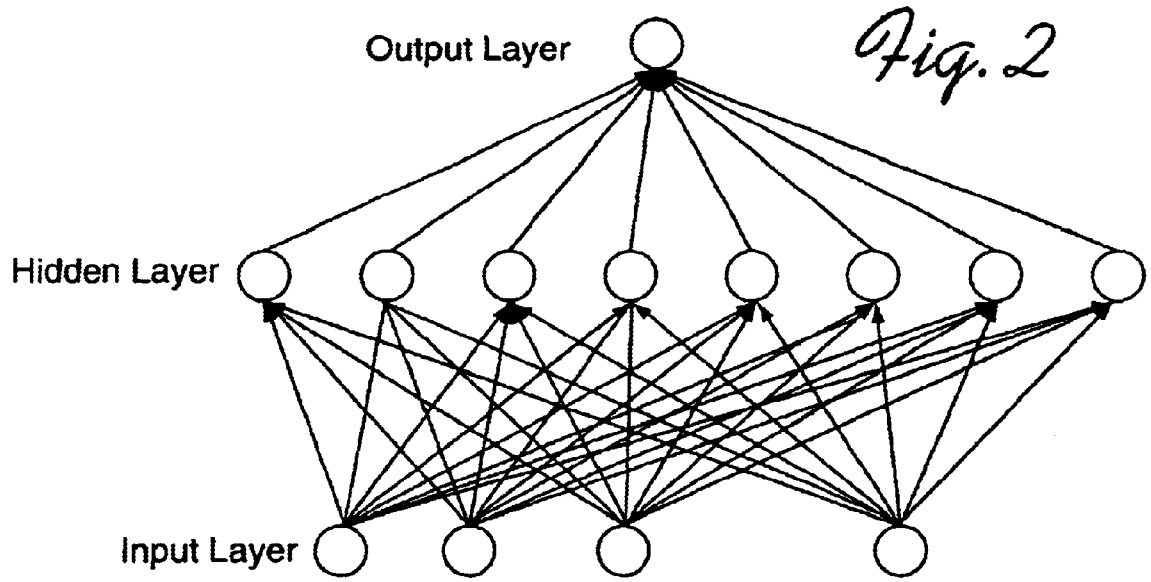
FIG. 2 illustrates a neural network used to implement the filter program in accordance with preferred embodiments of the present invention.

FIG. 2 illustrates a feed forward, back propagation neural network 20 in which the preferred embodiment filter program 6 is implemented. The feed forward back-propagation network 20 has an input layer, an output layer, and at least one hidden layer. Each layer is fully connected to the succeeding layer, which means that each node in one layer fully connects to each node of the following layer, i.e., each input node connects to every hidden layer node and each hidden layer node connects to every output node. In accordance with feedforward neural networks known in the art, a unique weighting value is applied to data flowing from one node into another node. The value of a hidden layer node is equal to the sum of data at all the weighted input nodes that connect to the hidden layer node. Likewise, each output node is equal to the sum of data at all the weighted hidden layer nodes that connect to the output layer node. As shown in FIG. 2, the sum result of all the operations is a single output value, which is preferably between 0 and 1. In preferred-embodiments, the number of hidden nodes is equal to the number of input and output nodes divided by two and rounded up to the nearest whole number.

In preferred embodiments, the input nodes of the neural network 20 receive information on words included in the document or packet being analyzed and from this generate the output value from 0 to 1. The developer would train neural networks 20 for different age groups. Before the training, the developer would determine a rating for training documents between zero and one. The rating would be based on general standards of appropriateness for the protected user. The term "protected user" as used herein refers to a child, employee or other person whose access to material will be inhibited and "administrator" refers to the purchaser of the product who wants to inhibit the protected user's access to content deemed inappropriate, such as the parent, school administrator, employer, etc.

The filter program 6 may specify the output values that would be deemed acceptable, e.g., values between 0 and 0.3, values deemed in a grey area requiring further consideration by the administrator, e.g., values between 0.3 and 0.6, and values deemed unacceptable for the protected user, e.g., values between 0.6 and 1.0. The values for each of the three range categories, acceptable, grey area requiring further consideration, and unacceptable may be adjusted by the administrator. For instance, if the administrator did not want to spend time resolving incoming data streams receiving output values in the grey area, then the administrator would set the grey area requiring further consideration to a very small range. On the other hand, if the administrator wants to tailor the network and is concerned about screening out too much, then the grey area range would be expanded to provide the administrator more control over how the neural network 20 is trained.

During operation, the filter program 6 would search the training document or packet for instances of certain predetermined words, such as unacceptable words and acceptable content words. For instance, the filter program 6 could search for sexual words and medical or health related words that may indicate the sexual word is part of an otherwise acceptable educational document on health or medicine. The filter program 6 would then input information on the instances of the predetermined words at the input nodes of the neural network 20 to produce an output value within one of the ranges.

During training, if the output value from the training document does not have the rating assigned by the developer, then the developer will use back propagation neural network training techniques known in the art to train the neural network 20 to produce the desired output value for that document. The back propagation learning process to train the network to produce a specific outcome based on a specific input is performed in iterative steps: information determined from one of the training documents or packets, such as the number of instances of unacceptable words, is applied to the input nodes of the neural network 20, and the network produces some output based on the current state of it's synaptic weights (initially, the output will be random). This output is compared to the developer selected rating, and a mean-squared error signal is calculated. The error value is then propagated backwards through the network, and small changes are made to the weights in each layer. The weight changes are calculated to reduce the error signal for the training document and assigned rating in question. The whole process is repeated for each of the training documents, then back to the first case again, and so on. The cycle is repeated until the overall error value drops below some pre-determined threshold. When the error level has fallen below the threshold, the neural network 20 has learned the problem sufficiently. In alternative embodiments, neural network training algorithms known in the art other than back propagation may be utilized.

The filter program 6 developer would repeat this training process for numerous packets or documents having different levels of acceptability to train the network for a wide range of different types of packets files, e.g., acceptable health material discussing sexual material, unacceptable material discussing sex, etc. By training the neural network for a wide range of packets or documents, the likelihood is increased that the neural network 20 would produce an accurate rating for documents that are not identical to the training documents. Thus, with the preferred embodiments two documents from different Internet web sites that are similar in content but different in presentation would likely produce the same acceptability rating.

To determine the input to the input nodes of the neural network 20, the filter program 6 would search for certain inappropriate words or phrases, e.g., sexual references, non-work related terms that are usually inappropriately searched by employees (e.g., sports scores, stock quotes, news, etc), hate words, etc., and content words, such as words indicating a medical or health slant to the packet or file, and count the number of such inappropriate or content words in the packet or file. Each input node of the neural network 20 would correspond to the percentage of instances of one inappropriate or content word or phrase in the document. Thus, a weighted presence of the word or phrase is used. For instance, the presence of one inappropriate word in a large document would have a relatively low weighting, whereas the present of one or two inappropriate words in a one line sentence could have a significantly high weighting. The filter program 6 would then input the percentage of instances of a specified word on the corresponding node for that word or phrase. In this way, the neural network 20 would base its output value decision on the percentage of instances of a word in the document that was on the predetermined list of words to consider. In this embodiment, there would have to be a node for each word in the word list.

In alternative embodiments, the list may group words or phrases according to categories or classes of language, e.g., swear words, hate words, sexual references, etc. There would then be a node for each category of words. In such case, the input to the input node layer would be the percentage of instances of a word or phrase of a particular category in the packet or document being considered. In further embodiments, additional nodes may be provided to indicate word proximity to provide a further level of detail in the input information that is used to generate the output rating of the input packet or file.

In preferred embodiments, the filter program 6 would have to maintain a list of predetermined inappropriate and content words on which to search. However, unlike prior art filtering programs, the presence of a particular predetermined inappropriate word will not cause the automatic rejection of the file. Instead, all inappropriate words and content words will be considered together in the neural network 20 to determine the acceptability of the document based on how the network 20 was trained to handle such documents. Thus, the preferred embodiment neural network 20 would consider the context of the words and not just issue a "knee jerk" reaction based on the presence of a few inappropriate words. For instance, the presence of one swear word and numerous references to the First Amendment of the United States Constitution may produce a neural network 20 acceptable rating for a filter program 6 trained for older children in accordance with the preferred embodiments, whereas such content may produce an unacceptable determination in prior art filtering software.

In certain embodiments, access may be inhibited by denying access to only those portions that include acceptable material, but allowing access to other portions that do not include unacceptable material. For instance, if the filter program 6 considers each packet transmitted over the Internet, the filter program 6 may allow those yielding acceptable output values to flow to the viewer 4*a, b, c,* while blocking access to packets producing unacceptable output values. In this way, access to an entire HTML document or communication will not be blocked, but only unacceptable parts. Thus, a child logged onto an appropriate children chat room will not be screened out from all chat room communications due to the presence of some person presenting an inappropriate message. The preferred embodiments would just screen out the inappropriate portions. In cases of filtering an entire document, the unacceptable phrases may be blocked out while allowing access to other parts of the document.

Figure 3:
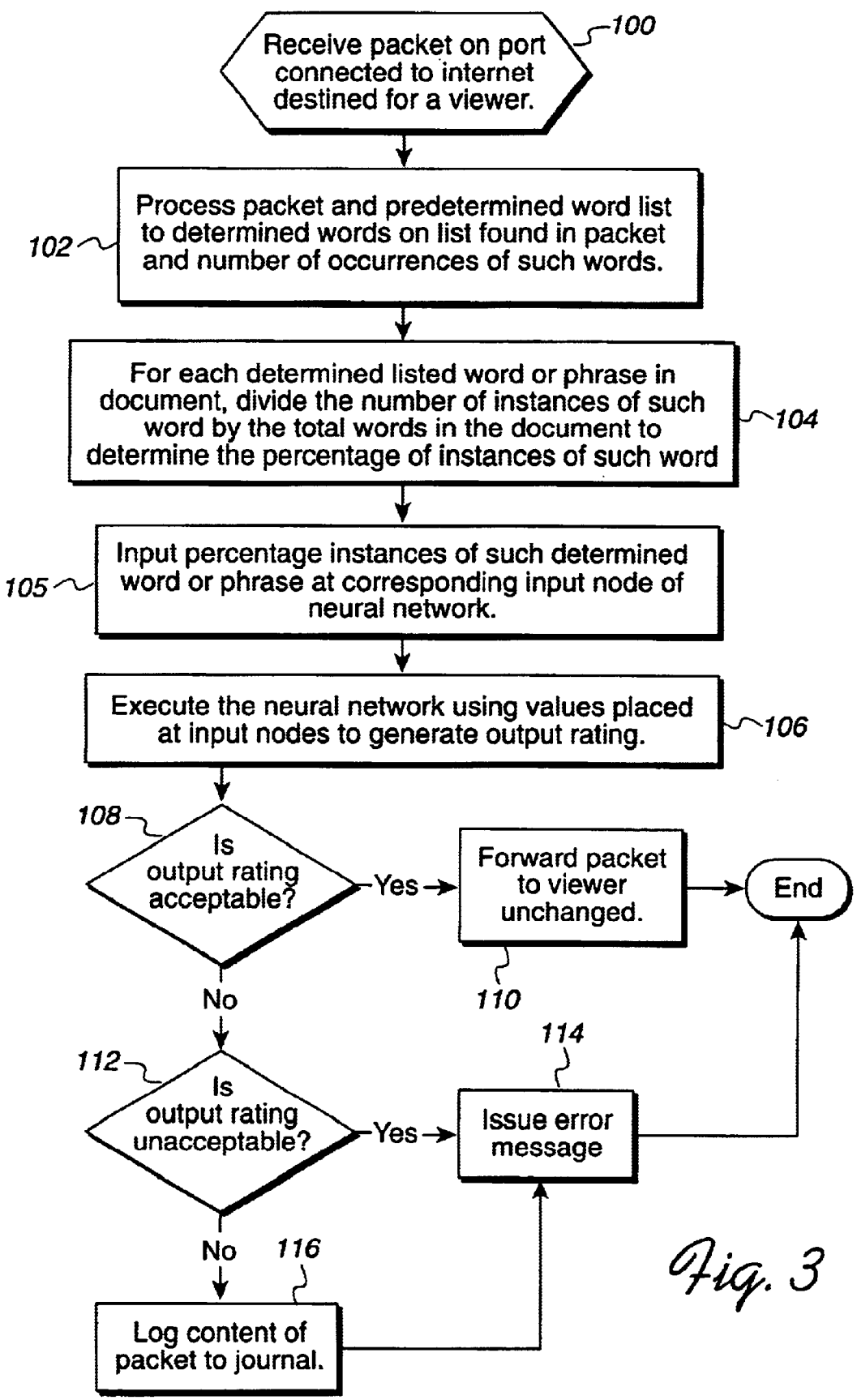
FIG. 3 illustrates logic to filter packets of a document in accordance with preferred embodiments of the present invention.

FIG. 3 illustrates logic implemented in the filter program 6 to screen packets transmitted over the Internet 10. Control begins at block 100 with the filter program 6 receiving a packet on a communication port connected to the Internet 10 destined for a viewer 4*a, b, c,* such as an HTML browser, chat room program software, etc. The filter program 6 would process (at block 102) the packet and a predetermined list of words or phrases, i.e., language statements, to locate words in the document that are on the list and the number of occurrences of such listed words or phrases. For each located listed word or phrase in the packet, the filter program 6 would determine the percentage (at block 104) of the determined number of instances of such word in the document as a whole by dividing the number of instances of the listed word or phrase by the total number of words in the document. This weighted or percentage number of instances of the listed word or phrase (at block 105) would then be placed on the input node of the neural network 20 corresponding to that word. As discussed, there may be a node for each listed word or phrase or for categories of words or phrases. Further, there may be additional nodes indicating the proximity of listed words. After inputting the information on the listed words or phrases included in the document or proximity information to the neural network nodes, the filter program 6 executes (at block 106) the neural network 20 to forward the data at the input nodes to the hidden layer nodes and then to the output layer node, applying the weights determined during the learning process. The output of this operation is an output rating between 0 and 1.

The filter program 6 then determines (at block 108) whether this output rating falls within the acceptable range. If so, the filter program forwards (at block 110) the packet to the viewer program 4*a, b, c* unchanged. Otherwise, if the output rating is not acceptable, then the filter program 6 determines whether the output rating is within the unacceptable range. If so, then the filter program 6 issues (at block 114) an error message. At this point, the error message could cause the filter program 6 to block the display of the entire document of which the packet is a part, or the filter program 6 could block the packet producing an unacceptable rating and allow other packets to proceed to the viewer 4*a, b, c.* If the output rating is not unacceptable, then it would fall within the further consideration category. In such case, the filter program 6 would log (at block 116) the content of the packet to a journal, and generate an error message to handle the unacceptable packet in the manner handled at block 114.

In embodiments where the filter program 6 only inhibits access to packets or portions of the document including unacceptable words or phrases, access is maximized and protected users are not blocked from otherwise acceptable material that receives an unacceptable rating. At the same time, the protected user is shielded from those words that are deemed offensive. This is an improvement over current Internet filtering techniques that bar access to specific sites as any site, including those deemed generally acceptable, may be occasionally bombarded with inappropriate content. Thus, unlike the prior art filters, the preferred embodiments shield users from inappropriate content that appears on an otherwise acceptable site, such as if someone posts inappropriate messages in a child oriented chat room.

Figure 4:
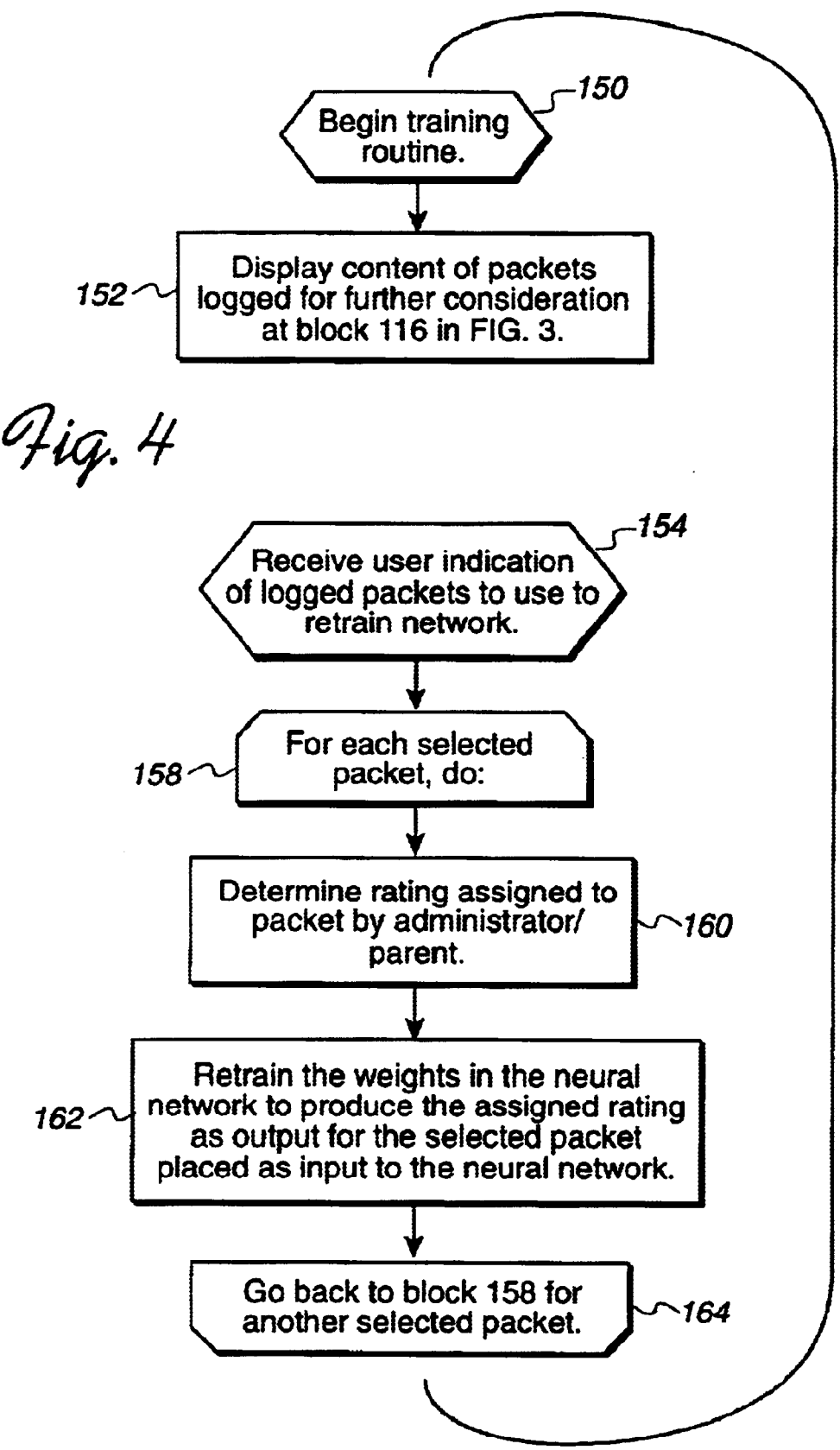
FIG. 4 illustrates logic to retrain the filter program in accordance with preferred embodiments of the present invention.

FIG. 4 illustrates logic implemented in the filter program 6 to allow an administrator to set ratings for packets or documents that are rated for further consideration, i.e., neither acceptable nor unacceptable. Control begins at block 150 with the initiation of a retraining routine to process those packets and or documents entered in the log requiring further consideration. This may be initiated by the administrator selecting through the filter program 6 graphical user interface (GUI) to retrain logged entries that yielded neither acceptable nor unacceptable ratings. The filter program 6 then displays (at block 152) the content of each packet logged at block 116 in FIG. 3. A GUI tool (not shown) would be provided to allow the administrator (parent) to assign a rating to the packet indicating its acceptability or unacceptability.

The filter program 6 then receives as input (at block 154) the administrator's selection of ratings assigned to logged packets. The filter program 6 then begins a loop at block 158 for each logged packet provided a new rating. For a selected logged packet, the filter program 6 determines (at block 160) the rating the user assigned to such packet. The filter program 6 then retrains the neural network 20, preferably using back propagation neural network training techniques known in the art, to adjust the weights applied between nodes to yield the rating assigned to the selected packet. To accomplish this, numerous iterations of the neural network 20 would be performed (at block 162) to adjust the weights until the output rating converged to the user assigned rating within an error threshold. Control then proceeds (at block 164) back to block 158 to consider any further selected logged packets. After training, the neural network 20 is configured to assign the administrator assigned rating to the packet. In this way, the administrator maintains the flexibility to retrain the network and the permissible content for new documents that are not rated clearly acceptable or unacceptable. This allows the filter program 6 to dynamically be adjusted for new documents and files.

Figure 5:
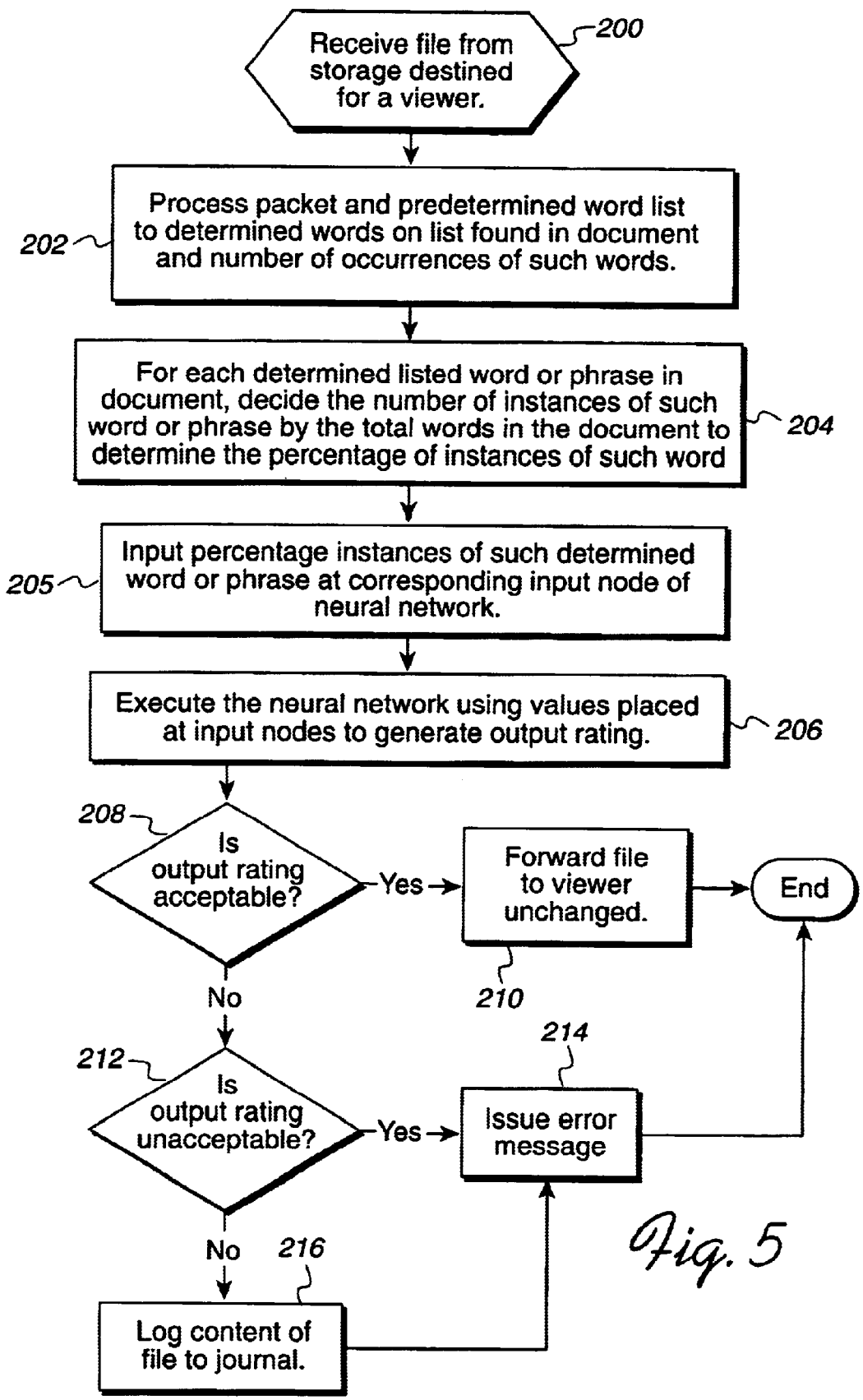
FIG. 5 illustrates logic to filter a document in accordance with preferred embodiments of the present invention.

FIG. 5 illustrates logic implemented in the filter program 6 to filter the content of a document being retrieved from storage 8 that is not transferred in packets, such as the case with the Internet 10 TCP/IP protocol. FIG. 5 is similar to FIG. 3 except that the entire document is screened and then any located words are passed through the neural network 20 to determine whether the document as a whole is acceptable or unacceptable. As with packets, when issuing the error message at block 214, upon determining that a document is unacceptable or needs further consideration, the filter program 6 could deny access to the entire document or filter out unacceptable words or phrases to display those portions of the document not including offensive languages. If a document was deemed acceptable, then no words, including those that are unacceptable, would be screened out. Further, the administrator may have an opportunity to retrain the neural network 20 to assign a specified rating to those documents logged at block 216 in FIG. 5, as with packets.

Preferred embodiments provide a more flexible approach to filtering inappropriate content than current filtering software techniques which merely screen for words. With preferred embodiments words are considered in context along with the number of occurrences of such words to assign a rating that is similar to what was assigned to the closest input document or packet used to train the neural network 20. By training the neural network with a wide range of document types, the neural network 20 is more likely capable of assigning an accurate ratings to different documents falling within the range of training documents or packets. The preferred approach attempts to provide a more realistic balance to filtering that takes into account other considerations of a document beyond the mere presence of an offending term or its point of origin, e.g., source Web site of term, to reduce the likelihood that appropriate and educational material is blocked.

CONCLUSION

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

In preferred embodiments, the filter program 6 would search for listed or predefined words or phrases or word categories. The administrator may add, remove, or modify the predefined words/word categories on which searches are performed. If the administrator makes such changes, then the neural network 20 must be adjusted to remove or add input nodes and hidden layer nodes to accommodate the changes in the words/word categories upon which searches are performed. After the neural network 20 is adjusted, then the nueral network would have to be retrained using training documents to produce the desired output values.

Preferred embodiments provided specific architecture and node arrangements for the feed forward, back propagating neural network 20. However, those skilled in the art will appreciate that alternative node arrangements, including the use of more or fewer layers of nodes, may be used with the described neural network architecture.

In summary, preferred embodiments disclose a method, system, and program for filtering a data object for content deemed unacceptable by a user. A data object requested by a viewer program is received. The data object is processed to determine predefined language statements. Information on the determined language statements is inputted into a neural network to produce an output value. A determination is then made as to whether the output value indicates that the data object is unacceptable. Viewer program access to the data object is inhibited upon determining that the data object is unacceptable.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for filtering a data object for content deemed unacceptable by an administrator for a protected user, comprising:

receiving a data object requested by a viewer program;

processing the data object to determine predefined language statements;

inputting information on the determined language statements into a neural network to produce an output value, determining whether the output value indicates that the data object is unacceptable; and inhibiting the viewer program access to the data object upon determining that the data object is unacceptable.

2. The method of claim 1, wherein the data object is acceptable if the output value is within a first predefined range of output values and the data object is unacceptable if the output value is within a second predefined range of output values, wherein determining whether the output value indicates that the data object is unacceptable comprises determining whether the output value falls within the second predefined range, further comprising forwarding the data object to the viewer program to display upon determining that the output value falls within the first predefined range.

3. The method of claim 1, further comprising:

determining whether the output value indicates that the data object requires further consideration;

logging information on the data object;

receiving user input on a rating indicating the acceptability of the data object; and training the neural network to process the logged data object as input to produce the received rating as output.

4. The method of claim 1, wherein processing the data object comprises determining a weighted number of occurrences of predefined language statements, wherein the neural network includes an input node for each predefined language statement and wherein inputting the information on the determined language statements comprises inputting the weighted number of occurrences of each predefined language statement on the input node corresponding to the predefined language statement.

5. The method of claim 4, further comprising:

changing the number of predefined language statements by adding and removing predefined language statements;

altering the neural network to change the number of input nodes such that there is one input node for each predefined language statement; and training the neural network to produce output values based on input data objects.

6. The method of claim 4, wherein the predefined language statements include unacceptable language statements and content language statements, further comprising:

determining the proximity of predefined content and unacceptable language statements; and inputting information on the proximity of the predefined language statements at input nodes, whereby the output value is based on the number of occurrences of unacceptable and content language statements and the proximity of content and unacceptable language statements.

7. The method of claim 1, wherein each language statement is a member of a class of language statements, wherein processing the data object comprises determining a weighted number of occurrences of the predefined language statements for each class, wherein the neural network includes an input node for each class of predefined language statements, and wherein inputting the information on the determined language statements comprises inputting the weighted number of occurrences of predefined language statements for each class on the input node corresponding to the class.

8. The method of claim 1, wherein inhibiting the viewer program access to the data object upon determining that the data object is unacceptable comprises blocking access to the entire data object.

9. The method of claim 1, further comprising determining language statements in the data object that are unacceptable, wherein inhibiting the viewer program access to the data object upon determining that the data object is unacceptable comprises blocking access to the unacceptable language statements and allowing access to language statements not determined to be unacceptable.

10. The method of claim 1, wherein the data object is one of multiple packets that combined form a document requested by the viewer.

11. The method of claim 10, wherein inhibiting the viewer program access to the data object upon determining that the data object is unacceptable comprises blocking access to the entire document of which the packet is a part.

12. The method of claim 10, wherein inhibiting the viewer program access to the data object upon determining that the data object is unacceptable comprises blocking access to only those packets determined to be unacceptable and allowing the viewer access to packets not determined to be unacceptable.

13. The method of claim 1, wherein the data object comprises a document, wherein inhibiting the viewer program access to the data object upon determining that the data object is unacceptable comprises blocking access to the entire document.

14. The method of claim 1, wherein the data object comprises a document, further comprising determining language statements in the document that are unacceptable, wherein blocking the viewer from accessing the document upon determining that the document is unacceptable comprises blocking access to only those language statements in the document determined to be unacceptable and allowing access to language statements in the document not determined to be unacceptable.

15. A system for filtering a data object for content deemed unacceptable by an administrator for a protected user, comprising:
   means for receiving a data object requested by a viewer program;
   means for processing the data object to determine predefined language statements;
   means for inputting information on the determined language statements into a neural network to produce an output value,
   means for determining whether the output value indicates that the data object is unacceptable; and
   means for inhibiting the viewer program access to the data object upon determining that the data object is unacceptable.

16. The system of claim 15, wherein the data object is acceptable if the output value is within a first predefined range of output values and the data object is unacceptable if the output value is within a second predefined range of output values, wherein the means for determining whether the output value indicates that the data object is unacceptable comprises means for determining whether the output value falls within the second predefined range, and further comprising means for forwarding the data object to the viewer program to display upon determining that the output value falls within the first predefined range.

17. The system of claim 15, further comprising:
   means for determining whether the output value indicates that the data object requires further consideration;
   means for logging information on the data object;
   means for receiving user input on a rating indicating the acceptability of the data object; and
   means for training the neural network to process the logged data object as input to produce the received rating as output.

18. The system of claim 15, wherein the means for processing the data object comprises means for determining a weighted number of occurrences of predefined language statements, wherein the neural network includes an input node for each predefined language statement and wherein inputting the information on the determined language statements comprises means for inputting the weighted number of occurrences of each predefined language statement on the input node corresponding to the predefined language statement.

19. The system of claim 18, further comprising:
   means for changing the number of predefined language statements by adding and removing predefined language statements;
   means for altering the neural network to change the number of input nodes such that there is one input node for each predefined language statement; and
   means for training the neural network to produce output values based on input data objects.

20. The system of claim 18, wherein the predefined language statements include unacceptable language statements and content language statements, further comprising:
   means for determining the proximity of predefined content and unacceptable language statements; and
   means for inputting information on the proximity of the predefined language statements at input nodes, whereby the output value is based on the number of occurrences of unacceptable and content language statements and the proximity of content and unacceptable language statements.

21. The system of claim 15, wherein each language statement is a member of a class of language statements, wherein the means for processing the data object comprises means for determining a weighted number of occurrences of the predefined language statements for each class, wherein the neural network includes an input node for each class of predefined language statements, and wherein the means for inputting the information on the determined language statements comprises means for inputting the weighted number of occurrences of predefined language statements for each class on the input node corresponding to the class.

22. The system of claim 15, wherein the means for inhibiting the viewer program access to the data object upon determining that the data object is unacceptable comprises means for blocking access to the entire data object.

23. The system of claim 15, further comprising means for determining language statements in the data object that are unacceptable, wherein the means for inhibiting the viewer program access to the data object upon determining that the data object is unacceptable comprises means for blocking access to the unacceptable language statements and allowing access to language statements not determined to be unacceptable.

24. The system of claim 15, wherein the data object is one of multiple packets that combined form a document requested by the viewer.

25. The system of claim 24, wherein the means for inhibiting the viewer program access to the data object upon determining that the data object is unacceptable comprises means for blocking access to the entire document of which the packet is a part.

26. The system of claim 24, wherein the means for inhibiting the viewer program access to the data object upon determining that the data object is unacceptable comprises means for blocking access to only those packets determined to be unacceptable and allowing the viewer access to packets not determined to be unacceptable.

27. The system of claim 15, wherein the data object comprises a document, wherein the means for inhibiting the viewer program access to the data object upon determining that the data object is unacceptable comprises means for blocking access to the entire document.

28. The system of claim 15, wherein the data object comprises a document, further comprising means for determining language statements in the document that are unacceptable, wherein blocking the viewer from accessing the document upon determining that the document is unacceptable comprises means for blocking access to only those language statements in the document determined to be unacceptable and allowing access to language statements in the document not determined to be unacceptable.

29. An article of manufacture for filtering a data object for content deemed unacceptable by an administrator for a protected user, the article of manufacture comprising computer readable storage media including at least one computer program embedded therein that causes a computer to perform:
    receiving a data object requested by a viewer program;
    processing the data object to determine predefined language statements;
    inputting information on the determined language statements into a neural network to produce an output value;
    determining whether the output value indicates that the data object is unacceptable; and
    inhibiting the viewer program access to the data object upon determining that the data object is unacceptable.

30. The article of manufacture of claim 29, wherein the data object is acceptable if the output value is within a first predefined range of output values and the data object is unacceptable if the output value is within a second predefined range of output values, wherein determining whether the output value indicates that the data object is unacceptable comprises determining whether the output value falls within the second predefined range, further comprising forwarding the data object to the viewer program to display upon determining that the output value falls within the first predefined range.

31. The article of manufacture of claim 29, further comprising:
    determining whether the output value indicates that the data object requires further consideration;
    logging information on the data object;
    receiving user input on a rating indicating the acceptability of the data object; and
    training the neural network to process the logged data object as input to produce the received rating as output.

32. The article of manufacture of claim 29, wherein processing the data object comprises determining a weighted number of occurrences of predefined language statements, wherein the neural network includes an input node for each predefined language statement and wherein inputting the information on the determined language statements comprises inputting the weighted number of occurrences of each predefined language statement on the input node corresponding to the predefined language statement.

33. The article of manufacture of claim 32, further comprising:
    changing the number of predefined language statements by adding and removing predefined language statements;
    altering the neural network to change the number of input nodes such that there is one input node for each predefined language statement; and
    training the neural network to produce output values based on input data objects.

34. The article of manufacture of claim 32, wherein the predefined language statements include unacceptable language statements and content language statements, further comprising:
    determining the proximity of predefined content and unacceptable language statements; and
    inputting information on the proximity of the predefined language statements at input nodes, whereby the output value is based on the number of occurrences of unacceptable and content language statements and the proximity of content and unacceptable language statements.

35. The article of manufacture of claim 29, wherein each language statement is a member of a class of language statements, wherein processing the data object comprises determining a weighted number of occurrences of the predefined language statements for each class, wherein the neural network includes an input node for each class of predefined language statements, and wherein inputting the information on the determined language statements comprises inputting the weighted number of occurrences of predefined language statements for each class on the input node corresponding to the class.

36. The article of manufacture of claim 29, wherein inhibiting the viewer program access to the data object upon determining that the data object is unacceptable comprises blocking access to the entire data object.

37. The article of manufacture of claim 29, further comprising determining language statements in the data object that are unacceptable, wherein inhibiting the viewer program access to the data object upon determining that the data object is unacceptable comprises blocking access to the unacceptable language statements and allowing access to language statements not determined to be unacceptable.

38. The article of manufacture of claim 29, wherein the data object is one of multiple packets that combined form a document requested by the viewer.

39. The article of manufacture of claim 38, wherein inhibiting the viewer program access to the data object upon determining that the data object is unacceptable comprises blocking access to the entire document of which the packet is a part.

40. The article of manufacture of claim 38, wherein inhibiting the viewer program access to the data object upon determining that the data object is unacceptable comprises blocking access to only those packets determined to be unacceptable and allowing the viewer access to packets not determined to be unacceptable.

41. The article of manufacture of claim 29, wherein the data object comprises a document, wherein inhibiting the viewer program access to the data object upon determining that the data object is unacceptable comprises blocking access to the entire document.

42. The article of manufacture of claim 29, wherein the data object comprises a document, further comprising determining language statements in the document that are unacceptable, wherein blocking the viewer from accessing the document upon determining that the document is unacceptable comprises blocking access to only those language statements in the document determined to be unacceptable and allowing access to language statements in the document not determined to be unacceptable.

* * * * *